(12) United States Patent
Kang et al.

(10) Patent No.: US 8,898,373 B1
(45) Date of Patent: *Nov. 25, 2014

(54) SYSTEM AND METHOD FOR IMPROVING WEAR-LEVELING PERFORMANCE IN SOLID-STATE MEMORY

(75) Inventors: Ho-Fan Kang, San Diego, CA (US); Cliff Pajaro, Costa Mesa, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 361 days.

This patent is subject to a terminal disclaimer.

(21) Appl. No.: 13/172,772

(22) Filed: Jun. 29, 2011

(51) Int. Cl.
*G06F 12/00* (2006.01)
*G06F 11/00* (2006.01)

(52) U.S. Cl.
USPC .................. 711/103; 711/104; 711/E12.008; 714/47.2

(58) Field of Classification Search
USPC ................................. 711/103, 104; 714/47.2
See application file for complete search history.

(56) References Cited

U.S. PATENT DOCUMENTS

| | | | |
|---|---|---|---|
| 6,016,275 A | 1/2000 | Han | |
| 6,230,233 B1 | 5/2001 | Lofgren et al. | |
| 6,594,183 B1 | 7/2003 | Lofgren et al. | |
| 6,732,221 B2 | 5/2004 | Ban | |
| 6,850,443 B2 | 2/2005 | Lofgren et al. | |
| 6,856,556 B1 | 2/2005 | Hajeck | |
| 7,096,313 B1 | 8/2006 | Chang et al. | |
| 7,126,857 B2 | 10/2006 | Hajeck | |
| 7,353,325 B2 | 4/2008 | Lofgren et al. | |
| 7,430,136 B2 | 9/2008 | Merry, Jr. et al. | |
| 7,447,807 B1 | 11/2008 | Merry et al. | |
| 7,502,256 B2 | 3/2009 | Merry, Jr. et al. | |
| 7,509,441 B1 | 3/2009 | Merry et al. | |
| 7,596,643 B2 | 9/2009 | Merry, Jr. et al. | |
| 7,653,778 B2 | 1/2010 | Merry, Jr. et al. | |
| 7,660,941 B2 | 2/2010 | Lee et al. | |
| 7,685,337 B2 | 3/2010 | Merry, Jr. et al. | |
| 7,685,338 B2 | 3/2010 | Merry, Jr. et al. | |
| 7,685,374 B2 | 3/2010 | Diggs et al. | |
| 7,733,712 B1 | 6/2010 | Walston et al. | |
| 7,765,373 B1 | 7/2010 | Merry et al. | |
| 7,797,481 B2 | 9/2010 | Lee et al. | |
| 7,898,855 B2 | 3/2011 | Merry, Jr. et al. | |
| 7,912,991 B1 | 3/2011 | Merry et al. | |

(Continued)

OTHER PUBLICATIONS

"NAND Evolution and its Effects on Solid State Drive (SSD) Useable Life", Western Digital White Paper WP-001-01R, downloaded from http://www.wdc.com/WDProducts/SSD/whitepapers/en/NAND_Evolution_0812.pdf, on Mar. 29, 2010, 16 pages.

(Continued)

*Primary Examiner* — Aracelis Ruiz

(57) ABSTRACT

Embodiments of the invention are directed to systems and methods for improving wear leveling performance in solid-state memory. The embodiments described herein make more consistent the number of wear leveling operations that needs to be performed, so that sudden spikes in the number wear leveling operations may be reduced in solid-state memory. In one embodiment, a staggered threshold-based wear leveling approach is used to spread out the execution of wear leveling operations that otherwise would have been triggered in clusters. Under the staggered threshold-based approach, wear leveling is periodically triggered by different wear leveling thresholds that are associated with various units of solid-state memory such as a group of blocks, so that only a certain amount of units are wear leveled at any given time.

21 Claims, 6 Drawing Sheets

(56) References Cited

U.S. PATENT DOCUMENTS

| | | |
|---|---|---|
| 7,936,603 B2 | 5/2011 | Merry, Jr. et al. |
| 7,962,792 B2 | 6/2011 | Diggs et al. |
| 8,078,918 B2 | 12/2011 | Diggs et al. |
| 8,090,899 B1 | 1/2012 | Syu |
| 8,095,851 B2 | 1/2012 | Diggs et al. |
| 8,099,545 B2 | 1/2012 | Biswas et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,239,614 B2 | 8/2012 | Asnaashari et al. |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,745,277 B2 | 6/2014 | Kan |
| 2003/0227804 A1 | 12/2003 | Lofgren et al. |
| 2004/0080985 A1 | 4/2004 | Chang et al. |
| 2005/0055495 A1 | 3/2005 | Vihmalo et al. |
| 2006/0106972 A1 | 5/2006 | Gorobets et al. |
| 2006/0203546 A1 | 9/2006 | Lasser |
| 2007/0294490 A1 | 12/2007 | Freitas et al. |
| 2008/0140918 A1* | 6/2008 | Sutardja ........................ 711/103 |
| 2008/0239811 A1 | 10/2008 | Tanaka |
| 2008/0313505 A1* | 12/2008 | Lee et al. ........................ 714/47 |
| 2009/0077429 A1 | 3/2009 | Yim et al. |
| 2009/0089485 A1 | 4/2009 | Yeh |
| 2009/0113112 A1 | 4/2009 | Ye et al. |
| 2009/0113121 A1 | 4/2009 | Lee et al. |
| 2009/0157952 A1 | 6/2009 | Kim et al. |
| 2009/0182936 A1 | 7/2009 | Lee |
| 2009/0216936 A1 | 8/2009 | Chu et al. |
| 2009/0240873 A1 | 9/2009 | Yu et al. |
| 2009/0327804 A1 | 12/2009 | Moshayedi |
| 2010/0023675 A1* | 1/2010 | Chen et al. .................... 711/103 |
| 2010/0174849 A1 | 7/2010 | Walston et al. |
| 2010/0250793 A1 | 9/2010 | Syu |
| 2011/0099323 A1 | 4/2011 | Syu |
| 2011/0276740 A1 | 11/2011 | Joo et al. |
| 2011/0283049 A1 | 11/2011 | Kang et al. |
| 2011/0296258 A1 | 12/2011 | Schechter et al. |
| 2012/0023144 A1 | 1/2012 | Rub |
| 2012/0072654 A1 | 3/2012 | Olbrich et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0324191 A1 | 12/2012 | Strange et al. |
| 2013/0132638 A1 | 5/2013 | Horn et al. |
| 2013/0145106 A1 | 6/2013 | Kan |
| 2013/0290793 A1 | 10/2013 | Booth et al. |
| 2014/0059405 A1 | 2/2014 | Syu et al. |
| 2014/0115427 A1 | 4/2014 | Lu |
| 2014/0133220 A1 | 5/2014 | Danilak et al. |
| 2014/0136753 A1 | 5/2014 | Tomlin et al. |

OTHER PUBLICATIONS

"Eliminating Unscheduled Downtime by Forecasting Useable Life / SiliconDrive SiSMART Technology", Western Digital White Paper WP-008-06R, downloaded from http://www.wdc.com/WDProducts/SSD/whitepapers/en/SiliconDrive_SiSMART.pdf, on Mar. 29, 2010, 8 pages.

Office Action for U.S. Appl. No. 12/895,691, dated Dec. 20, 2012, in 25 pages.

U.S. Appl. No. 12/895,691, System and Method for Improvin Wear-Leveling Performance in Solid-State Memory, Sep. 30, 2010.

U.S. Appl. No. 12/895,891, filed Sep. 30, 2010, to Ho-Fan Kang, et al., 22 pages.

* cited by examiner

FIGURE 2A

Erase Counter
Table

| SB #0 | 1 |
| SB #1 | 8 | — 210
| SB #2 | 3 |
| SB #3 | 4 |
| SB #4 | 3 |
| SB #5 | 3 |
| SB #6 | 1 |
| SB #7 | 4 |

Super Block
Designation
(Set of Blocks
Distributed Across
Dies)

| SB #0 | 8 | — Wear Leveling
| SB #1 | 2 | — Swapped Blocks in These
| SB #2 | 3 |       Two SuperBlocks
| SB #3 | 4 |
| SB #4 | 3 |
| SB #5 | 3 |
| SB #6 | 1 |
| SB #7 | 4 |

FIGURE 5A

Before Erase

|  | Blk 0 - Threshold 8 | Blk 1 - Threshold 9 | Blk 2 - Threshold 10 | Blk 3 - Threshold 11 | Blk 4 - Threshold 12 | Blk 5 - Threshold 13 | Blk 6 - Threshold 14 | Blk 7 - Threshold 15 |
|---|---|---|---|---|---|---|---|---|
| SB #0 | 1 | 1 | 1 | 1 | 1 | 1 | 1 | 1 |
| SB #1 | 7 | 7 | 7 | 7 | 7 | 7 | 7 | 7 |
| SB #2 | 3 | 3 | 3 | 3 | 3 | 3 | 3 | 3 |
| SB #3 | 4 | 4 | 4 | 4 | 4 | 4 | 4 | 4 |
| SB #4 | 4 | 4 | 4 | 4 | 4 | 4 | 4 | 4 |
| SB #5 | 3 | 3 | 3 | 3 | 3 | 3 | 3 | 3 |
| SB #6 | 1 | 1 | 1 | 1 | 1 | 1 | 1 | 1 |
| SB #7 | 4 | 4 | 4 | 4 | 4 | 4 | 4 | 4 |

Staggered Threshold Wear Leveling

FIGURE 5B

|  | Blk 0 - Threshold 8 | Blk 1 - Threshold 9 | Blk 2 - Threshold 10 | Blk 3 - Threshold 11 | Blk 4 - Threshold 12 | Blk 5 - Threshold 13 | Blk 6 - Threshold 14 | Blk 7 - Threshold 15 |
|---|---|---|---|---|---|---|---|---|
| SB #0 | 1 | 1 | 1 | 1 | 1 | 1 | 1 | 1 |
| SB #1 | 8 | 8 | 8 | 8 | 8 | 8 | 8 | 8 |
| SB #2 | 3 | 3 | 3 | 3 | 3 | 3 | 3 | 3 |
| SB #3 | 4 | 4 | 4 | 4 | 4 | 4 | 4 | 4 |
| SB #4 | 4 | 4 | 4 | 4 | 4 | 4 | 4 | 4 |
| SB #5 | 3 | 3 | 3 | 3 | 3 | 3 | 3 | 3 |
| SB #6 | 1 | 1 | 1 | 1 | 1 | 1 | 1 | 1 |
| SB #7 | 4 | 4 | 4 | 4 | 4 | 4 | 4 | 4 |

← SB#1 Erased

FIGURE 5C

Wear Leveling Swapped These Two Blocks

|  | Blk 0 - Threshold 8 | Blk 1 - Threshold 9 | Blk 2 - Threshold 10 | Blk 3 - Threshold 11 | Blk 4 - Threshold 12 | Blk 5 - Threshold 13 | Blk 6 - Threshold 14 | Blk 7 - Threshold 15 |
|---|---|---|---|---|---|---|---|---|
| SB #0 | 8 | 1 | 1 | 1 | 1 | 1 | 1 | 1 |
| SB #1 | 2 | 8 | 8 | 8 | 8 | 8 | 8 | 8 |
| SB #2 | 3 | 3 | 3 | 3 | 3 | 3 | 3 | 3 |
| SB #3 | 4 | 4 | 4 | 4 | 4 | 4 | 4 | 4 |
| SB #4 | 4 | 4 | 4 | 4 | 4 | 4 | 4 | 4 |
| SB #5 | 3 | 3 | 3 | 3 | 3 | 3 | 3 | 3 |
| SB #6 | 1 | 1 | 1 | 1 | 1 | 1 | 1 | 1 |
| SB #7 | 4 | 4 | 4 | 4 | 4 | 4 | 4 | 4 |

FIGURE 5D

|  | Blk 0 - Threshold 8 | Blk 1 - Threshold 9 | Blk 2 - Threshold 10 | Blk 3 - Threshold 11 | Blk 4 - Threshold 12 | Blk 5 - Threshold 13 | Blk 6 - Threshold 14 | Blk 7 - Threshold 15 |
|---|---|---|---|---|---|---|---|---|
| SB #0 | 8 | 1 | 1 | 1 | 1 | 1 | 1 | 1 |
| SB #1 | 2 | 8 | 8 | 8 | 8 | 8 | 8 | 8 |
| SB #2 | 3 | 3 | 3 | 3 | 3 | 3 | 3 | 3 |
| SB #3 | 4 | 4 | 4 | 4 | 4 | 4 | 4 | 4 |
| SB #4 | 4 | 4 | 4 | 4 | 4 | 4 | 4 | 4 |
| SB #5 | 3 | 3 | 3 | 3 | 3 | 3 | 3 | 3 |
| SB #6 | 1 | 1 | 1 | 1 | 1 | 1 | 1 | 1 |
| SB #7 | 4 | 4 | 4 | 4 | 4 | 4 | 4 | 4 |

Before Erase

FIGURE 5F

Rule-Based Wear Leveling

|  | Blk 0 - Threshold 8 | Blk 1 - Threshold 9 | Blk 2 - Threshold 10 | Blk 3 - Threshold 11 | Blk 4 - Threshold 12 | Blk 5 - Threshold 13 | Blk 6 - Threshold 14 | Blk 7 - Threshold 15 |
|---|---|---|---|---|---|---|---|---|
| SB #0 | 8 | 9 | 1 | 1 | 1 | 1 | 1 | 1 |
| SB #1 | 3 | 2 | 9 | 9 | 9 | 9 | 9 | 9 |
| SB #2 | 3 | 3 | 3 | 3 | 3 | 3 | 3 | 3 |
| SB #3 | 4 | 4 | 4 | 4 | 4 | 4 | 4 | 4 |
| SB #4 | 4 | 4 | 4 | 4 | 4 | 4 | 4 | 4 |
| SB #5 | 3 | 3 | 3 | 3 | 3 | 3 | 3 | 3 |
| SB #6 | 1 | 1 | 1 | 1 | 1 | 1 | 1 | 1 |
| SB #7 | 4 | 4 | 4 | 4 | 4 | 4 | 4 | 4 |

Wear Leveling Swapped These Two Blocks

FIGURE 5E

|  | Blk 0 - Threshold 8 | Blk 1 - Threshold 9 | Blk 2 - Threshold 10 | Blk 3 - Threshold 11 | Blk 4 - Threshold 12 | Blk 5 - Threshold 13 | Blk 6 - Threshold 14 | Blk 7 - Threshold 15 |
|---|---|---|---|---|---|---|---|---|
| SB #0 | 8 | 1 | 1 | 1 | 1 | 1 | 1 | 1 |
| SB #1 | 3 | 9 | 9 | 9 | 9 | 9 | 9 | 9 |
| SB #2 | 3 | 3 | 3 | 3 | 3 | 3 | 3 | 3 |
| SB #3 | 4 | 4 | 4 | 4 | 4 | 4 | 4 | 4 |
| SB #4 | 4 | 4 | 4 | 4 | 4 | 4 | 4 | 4 |
| SB #5 | 3 | 3 | 3 | 3 | 3 | 3 | 3 | 3 |
| SB #6 | 1 | 1 | 1 | 1 | 1 | 1 | 1 | 1 |
| SB #7 | 4 | 4 | 4 | 4 | 4 | 4 | 4 | 4 |

← SB#1 Erased

SYSTEM AND METHOD FOR IMPROVING WEAR-LEVELING PERFORMANCE IN SOLID-STATE MEMORY

BACKGROUND

1. Technical Field

This disclosure relates to solid-state storage systems. In particular, this disclosure relates to a system and method for improving wear-leveling performance.

2. Description of Related Art

Wear leveling is commonly used in Solid State Drives (SSDs) to prolong their lifecycle. A typical wear leveling operation involves moving data content in a first block of memory to a second block of memory that has just reached a certain erase level/count because of a recent erase operation. The first block of memory is then erased and made available for a future write operation. The overall process of wear leveling ensures that erase operations are evenly spread across blocks of memory in a SSD. Since each erase operation increases the wear of a block by incrementally reducing the block's ability to properly retain data content, wear leveling helps prevent certain blocks of memory from receiving an excessive amount of erase operations relative to other blocks and thus experiencing data failures much earlier than other blocks.

BRIEF DESCRIPTION OF THE DRAWINGS

Systems and methods which embody the various features of the invention will now be described with reference to the following drawings, in which:

FIGS. 2A and 2B are block diagrams illustrating changes to an example erase counter table in response to the triggering of a uniform threshold-based wear leveling operation.

FIGS. 5A-5F are block diagrams that illustrate an example set of superblocks that are undergoing staggered threshold-based wear leveling operations.

DETAILED DESCRIPTION

While certain embodiments of the inventions are described, these embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions.

System Overview

Embodiments of the invention are directed to systems and methods for improving wear leveling performance in solid-state memory. The embodiments described herein make more consistent the number of wear leveling operations that needs to be performed, so that sudden spikes in the number wear leveling operations may be reduced in solid-state memory. In one embodiment, a staggered threshold wear leveling approach is used to spread out the execution of wear leveling operations that otherwise would have been triggered in clusters. With the use of staggered thresholds, different thresholds are assigned to different elements within a group of solid-state memory elements that is commonly erased together, such as a group of blocks. For example, a group of blocks may be distributed across several dies, with one block in each die. Each block in the group may have a different threshold so that the thresholds in the group are staggered and the wear leveling operations are triggered in a staggered fashion that reduces the chance that the operations are triggered in clusters.

As used in this application, "non-volatile memory" typically refers to solid-state memory such as NAND flash. However, the systems and methods of this disclosure may also be useful in more conventional hard drives and hybrid drives including both solid-state and hard drive components. As such, while certain internal operations are referred to which typically are associated with solid-state drives, such as "wear leveling" and "garbage collection," analogous operations for hard drives can also take advantage of this disclosure. Solid-state memory may comprise a wide variety of technologies, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM (non-volatile memory) chips. The solid-state storage devices may be physically divided into planes, blocks, pages, and sectors, as is known in the art. Other forms of storage (e.g., battery backed-up volatile DRAM or SRAM devices, magnetic disk drives, etc.) may additionally or alternatively be used.

Figure 1:
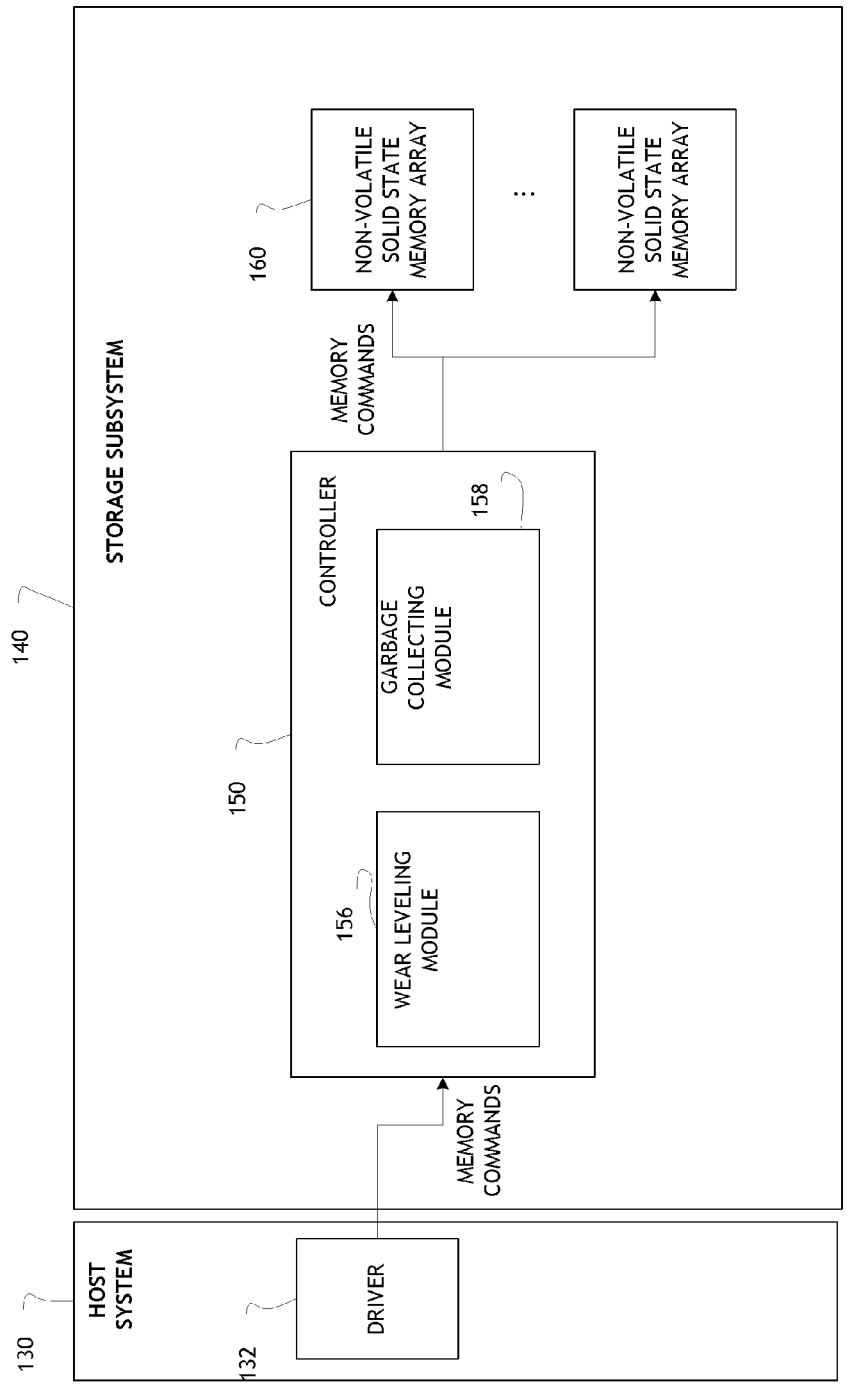
FIG. 1 is a block diagram illustrating a solid-state storage subsystem with a wear leveling module according to one embodiment.

FIG. 1 is a block diagram illustrating a storage subsystem embodiment with a wear leveling module. As shown, a storage subsystem 140 includes a controller 150, which in turn includes a wear leveling module 156 and a garbage collection module 158. In one embodiment, the wear leveling module 156 is responsible for issuing wear leveling commands and the garbage collection module is responsible for issuing garbage collection commands, with the controller 150 relaying those commands to non-volatile solid-state memory arrays 160 for execution. In one embodiment, the wear leveling module 156 is configured to select blocks for wear leveling and issue wear leveling commands in accordance with the methods described in this disclosure. In one embodiment, the controller 150 is configured to receive memory commands from a driver 132 residing on a host system 130 and execute commands in response to those host-issued memory commands in the non-volatile solid-state memory arrays 160.

Wear Leveling Operations

FIGS. 2A and 2B are block diagrams illustrating changes to a simplified example erase counter table in response to the triggering of a uniform threshold-based wear leveling operation. As the name implies, uniform threshold-based wear leveling is triggered when a certain unit of memory (e.g., a block or superblock) reaches a particular erase count threshold. It is important to note that although the term "superblock" is used throughout the specification to refer to a group of blocks, various embodiments of the invention are not limited to blocks or groups of blocks and are applicable to control wear leveling in solid-state storage devices with other internal configurations and memory units such as pages, sectors, etc.

FIG. 2A shows an erase counter table 210 that tracks the erase counts recorded for various superblocks in the non-volatile memory. A superblock is a group of memory blocks, and in one embodiment, each block in a superblock is on one die of a group of dies. Other configurations are possible in other embodiments. For example, in one embodiment, a superblock is comprised of blocks from various planes in a group of dies. In another embodiment, multiple blocks within a superblock may be on the same die/plane. In the embodiment shown, the erase counter for each superblock is assumed to begin at zero and erase operations are performed by the garbage collection module 158 largely on a superblock basis.

In the simplified example of FIGS. 2A and 2B, the threshold for triggering wear leveling is 8 erase counts. In FIG. 2A, Superblock No. 1 has just been erased and reaches the threshold of 8. This means that all blocks within Superblock No. 1 are now in need of wear leveling since they all have been erased eight times. The counter table 210 in FIG. 2B shows the erase counter table after the performance of wear leveling on blocks within Superblock No. 1. Superblock No. 0 is chosen to participate in the wear leveling operation because its blocks, along with those in Superblock No. 6, have been erased the fewest number of times (i.e., they have the least wear). The wear leveling operation in this simplified example involves (1) moving the data contents of blocks in Superblock No. 0 into blocks in Superblock No. 1, (2) erasing those blocks in Superblock No. 2, and (3) swapping the assignment of blocks in Superblock Nos. 0 and 1. The wear leveling operation of blocks in Superblock Nos. 0 and 1 as shown and described is for illustration only in this simplified example, as in various embodiments the particular blocks on which wear leveling are performed are selected in accordance with a number of rules and configurations, as will be further described below. For example, a block that is due to be wear leveled may be wear leveled with another block on the same die. As illustrated in FIGS. 2A and 2B, with uniform threshold-based wear leveling, the number of wear leveling operations that is triggered by an erase operation may be quite large. In the example, if each superblock includes 32 blocks, then 32 wear leveling operations must be performed at once when a superblock reaches a wear leveling threshold. The sudden requirement of having to perform 32 wear leveling operations may negatively impact the throughput of host-issued memory commands that the controller can handle.

Figure 3:
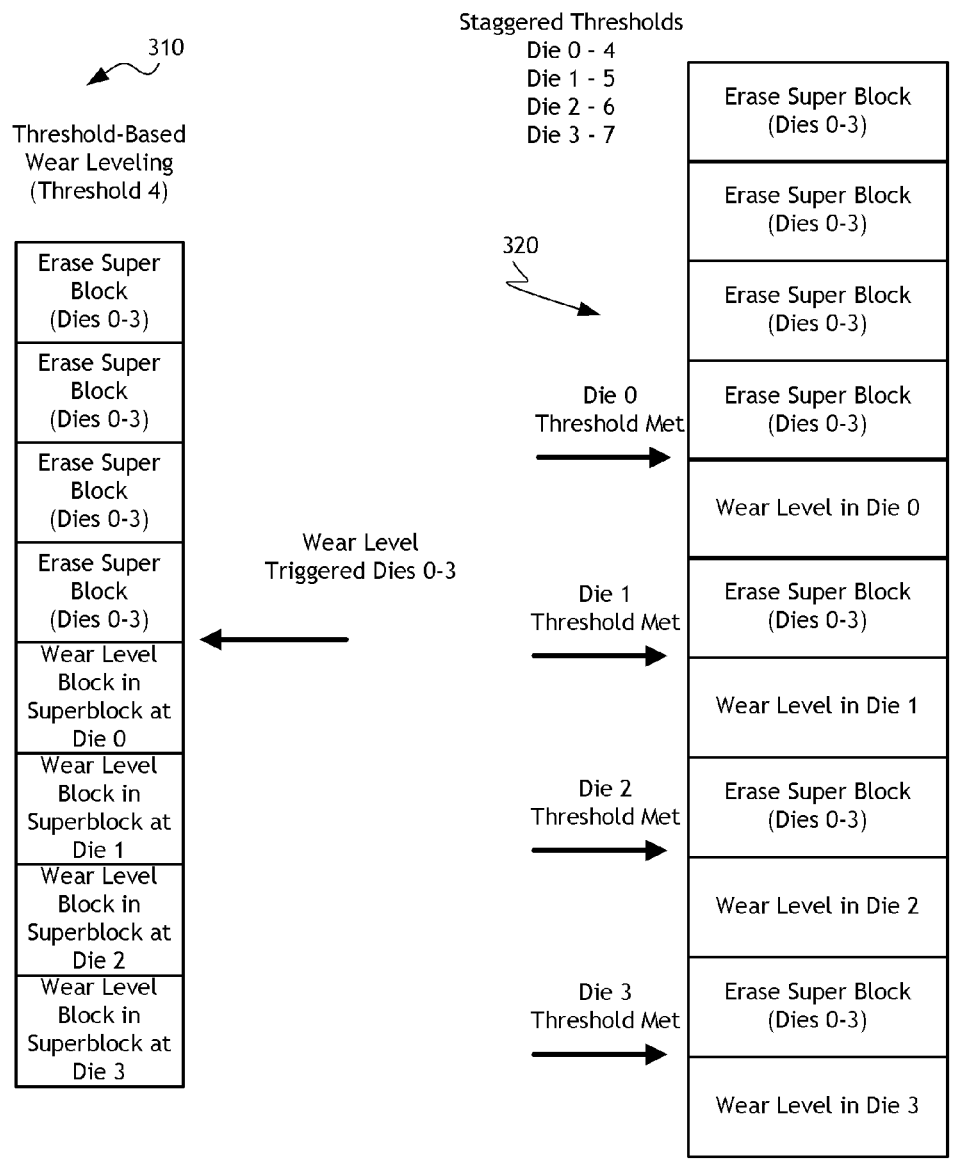
FIG. 3 is a block diagram illustrating the differences between an example sequence of events associated with a uniform threshold-based wear leveling operation and that which is associated with a staggered threshold-based wear leveling operation in accordance with one embodiment.

FIG. 3 further illustrates the uniform threshold-based wear leveling approach (illustration 310) and compares it to the staggered threshold-based wear leveling approach (illustration 320) in accordance with one embodiment. In the example shown in illustration 310, the threshold for wear leveling is 4, and the example superblock consists of four blocks, each from Dies No. 0-3. Both illustrations 310 and 320 are block diagrams that illustrate operations performed in sequence and arranged chronologically from top to bottom. Illustration 310 shows that four consecutive erase operations are performed on the example superblock. At the end of the fourth erase operation, wear leveling is triggered for all four blocks within the example superblock, and hence four wear leveling operations (one for each block in Dies No. 0-3) must be performed as shown.

Overview of Staggered Threshold-Based Wear Leveling

Illustration 320 shows a different sequence under the staggered threshold-based wear leveling approach, which spreads out the execution of wear leveling operations that otherwise would have been triggered together. As its name suggests, in one embodiment, the staggered threshold-based approach ensures that the blocks in a superblock are periodically wear leveled according to a set of staggered thresholds instead of being triggered by a uniform threshold across the various blocks. In one embodiment, blocks in a superblock are periodically wear leveled based on staggered threshold assignments. In one embodiment, the staggered thresholds are set in accordance with an interval threshold value denoting a number of erase operations between two wear leveling operations (wear levels). The interval is set to 4 in the example shown in FIG. 3, and each die is assigned threshold according to the interval. In this example, the four dies (Dies 0-3) are staggered thresholds such that Die 0 has a threshold of 4, Die 1 has a threshold of 5, Die 2 has a threshold of 6, and Die 3 has a threshold of 7.

In one embodiment, the interval value is based on the maximum number of lifetime erases divided by the number of wear levels. For example, a superblock with a maximum number of lifetime erases of 256 and 32 wear levels may have the interval value set at 8. Assume further in that example that the 32 blocks are distributed across 32 dies. Thus the dies may be assigned thresholds as follows for the first wear level:

| Die   | Initial Threshold |
|-------|-------------------|
| 0-3   | 8                 |
| 4-7   | 9                 |
| 8-11  | 10                |
| 12-15 | 11                |
| 16-19 | 12                |
| 20-23 | 13                |
| 24-27 | 14                |
| 28-31 | 15                |

The staggered initial thresholds (8-15) may be assigned on a rotation basis to the blocks from different dies or planes. Alternatively, in another embodiment, the thresholds may be a sum of the position number of the block within the superblock and the interval threshold. For example, if the interval threshold is 32 then the thresholds for the 32 dies could be 33, 34, 35, 36, and so on. Alternatively, the same variations can be applied to individual blocks within the superblock regardless of whether the blocks belong to the same or different dies or planes. In addition, after the last threshold has been reached (threshold 15 in this example), the thresholds may be changed to accommodate the next wear level. For example, the next set of thresholds would be 16-23, and the set after would be 24-31, and so on. The staggered threshold approach avoids the sudden need to execute a large number of wear leveling operations while ensuring that blocks are properly selected for wear leveling over a period of time for even wear. Preferably, the thresholds are set such that no more than X % of the blocks of any superblock can be wear leveled at a time, where X is in the range of 2 to 20, and more preferably in the range of about 3.13% (1 of 32) to 6.25% (1 of 16).

Returning to FIG. 3, as shown in illustration 320, as the interval is set at 4, the individual threshold for each die is set accordingly for this first wear level. After the fourth erase operation is performed, the threshold of Die No. 0 (which is 4) is met and wear leveling is performed there. Then after the fifth erase operation is performed, the threshold of Die No. 1 (which is 5) is met and wear leveling is performed there, and so on, until the thresholds become 8-11 in the next wear level. In one embodiment, the block that is selected for wear leveling is the block that triggered the need for wear leveling. That block is wear-leveled with a lesser worn block in the same die. That may involve reassigning the lesser worn block to the example superblock (in place of the block that just triggered the threshold), copying data from the lesser worn block to the just erased block, and erasing the lesser worn block. The staggered threshold-based wear leveling approach will be further described in FIG. 4.

Staggered Threshold Wear Leveling Operation

Figure 4:
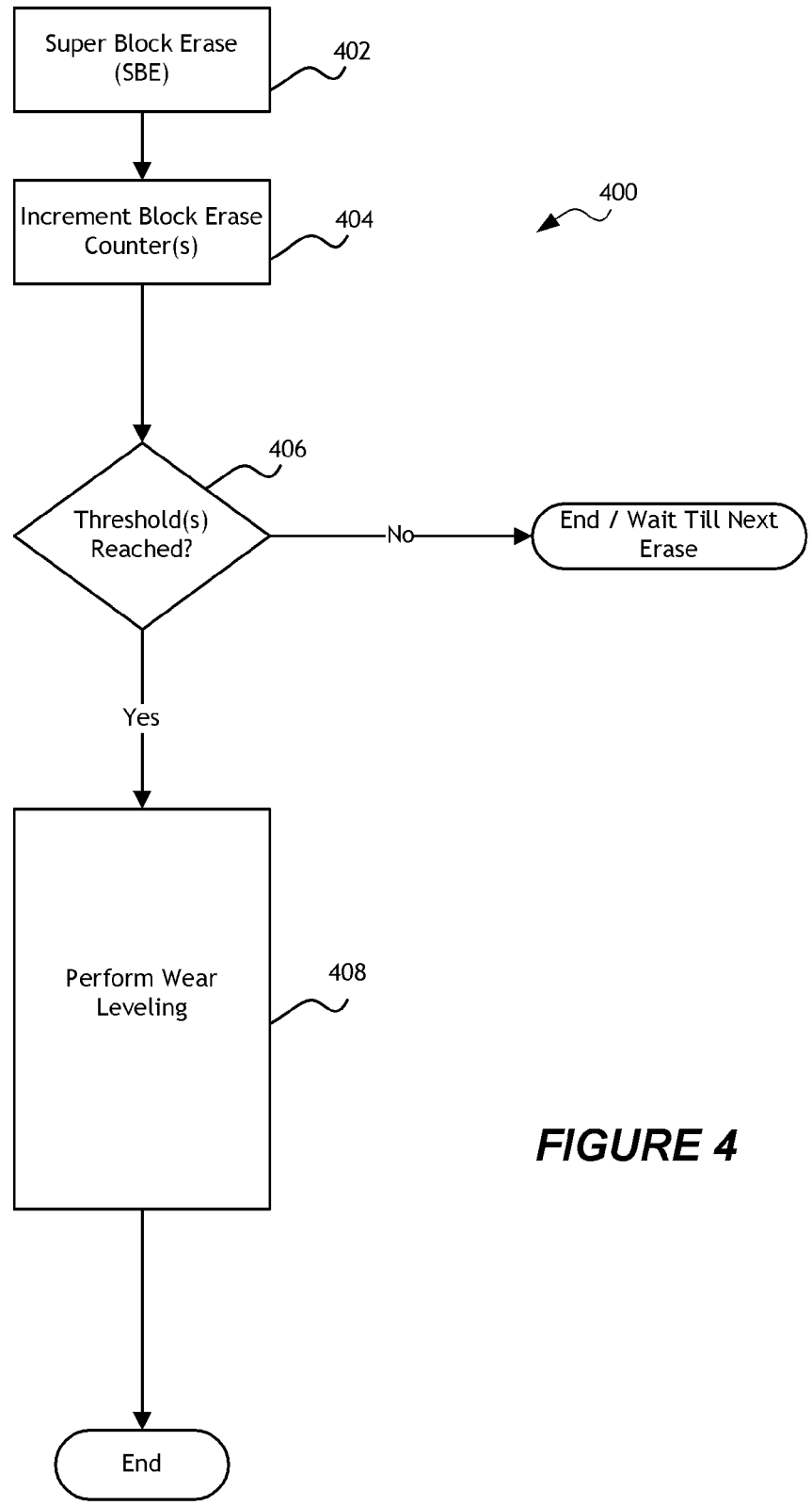
FIG. 4 is a flow diagram showing a process of staggered threshold-based wear leveling in accordance with one embodiment.

FIG. 4 is a flow diagram showing a process 400 of staggered threshold-based wear leveling in accordance with one embodiment. In one embodiment, the process 400 is performed by the controller 150 and/or wear leveling module 156. At block 402, an erase operation is performed on a superblock. At block 404, one or more erase counter(s) are incremented in response to the erase operation. For example, in one embodiment, the blocks in a superblock each has an associated erase counter, and upon an erase operation performed at the superblock level, the erase counters of the blocks within the superblock are incremented. In other embodiments, the blocks are individually erasable and their counters are incremented as the blocks are erased. Regardless, at block 406, the process checks whether a threshold has been reached. In one embodiment, the process checks one or more thresholds associated with the particular superblock that has just been erased. For example, if a superblock has eight blocks distributed across eight dies and each block (in each die) has a different threshold, eight checks may be performed to see if the erase counts of the individual blocks have crossed their respective thresholds. This will be further illustrated in FIGS. 5A-5F. In one embodiment, this may be determined according to the following equation for each block: (current erase count−position number of the block/die/plane) mod interval threshold. If the result is zero, then the threshold has been met by the block and wear leveling is performed on that block at block 408. If it is not, the process terminates and waits until the next erase operation is performed on the same superblock, at which time the process will begin anew at block 400. The modulo operation above takes into account that the thresholds will be different for different wear levels, though the thresholds will follow the same staggered pattern.

EXAMPLES

FIGS. 5A-5F are block diagrams that illustrate an example set of superblocks that are undergoing staggered threshold-based wear leveling operations. The tables in FIGS. 5A-5F show the erase counters for eight example superblocks (Superblocks Nos. 0-7). Each example superblock has eight blocks, which are tracked across the columns as Blocks Nos. 0-7. In one embodiment, each block of Blocks Nos. 0-7 is located on a different die or plane, though for the purpose of illustration they will be described as being located on a different die of Dies Nos. 0-7. In certain embodiments, multiple blocks of a superblock will reside on the same die/plane. In addition, in the example of FIGS. 5A-5F, each block/die has an associated threshold (8, 9, 10, and so on) and the interval wear level threshold is 8. FIG. 5A shows the state of the superblocks before an erase operation is performed. FIG. 5B shows that Superblock No. 1 is erased, and the erase counters for the blocks within Superblock No. 1 are incremented (a process previously shown in block 404 of FIG. 4). Because the erase count is now 8, wear level is triggered in Block No. 0 (in Die No. 0), as shown in FIG. 5C.

In one embodiment, a lesser worn block is chosen in Die No. 0 to be wear leveled with the block that just triggered the wear leveling (from the just erased Block No. 0 in Superblock No. 1). FIG. 5C illustrates this wear leveling. The wear leveling operation moves data from a lesser worn block with data on Die No. 0 (the block assigned to Superblock No. 0) to the block assigned to Superblock No. 1, and then erases the block assigned to Superblock No. 0. Then the superblock assignments of the two blocks are switched so that the block assigned to Superblock No. 0 is re-assigned to Superblock No. 1 and vice versa. The updated erase counts are shown in FIG. 5C.

FIGS. 5D-5F illustrate the next erase cycle, with FIG. 5D showing the state of the superblocks before the next erase operation. Due to the nature of the staggered thresholds, a different die will trigger the threshold after this erase. In this way, the wear leveling needs are spread out over time instead of being triggered in clusters. FIG. 5E shows that Superblock No. 1 is erased again, and this time Block No. 1 (with threshold 9) has reached its wear leveling threshold. Therefore, in FIG. 5F, wear leveling is now performed on Block No. 1 (in Die No. 1). In FIG. 5F, Block No. 1 (in Die No. 1) in Superblock No. 1 is wear leveled with Block No. 1 assigned to Superblock No. 0, a lesser worn block. In one embodiment, the controller is configured to select a least worn block in the same memory unit (die, plane, etc.) for wear leveling (instead of just a lesser worn block). This happens to be the case here since Block No. 1 of Superblock No. 0 has an erase counter showing "1", which is the lowest among the blocks in the same die. The wear leveling operation moves data from the block assigned to Superblock No. 0 to the block assigned to Superblock No. 1, and then erases the block assigned to Superblock No. 0. Then the superblock assignments of the two blocks are switched so that the block assigned to Superblock No. 0 is re-assigned to Superblock No. 1 and vice versa. The updated erase counts are shown in FIG. 5F. Once all the thresholds have been reached, meaning that the current wear level has been met, the thresholds are reset in one embodiment to 16-23 for the next wear level, and 24-31 for the level after, and so on. In one embodiment, instead of resetting the thresholds per wear level, a modulo operation is performed based on the erase count, a position number (or other assigned number) of the individual block within the superblock, and the interval threshold. One such example modulo operation is the one described above in conjunction with FIG. 4, though those skilled in the art will understand that other configurations or data operations may be used/performed to keep track of the staggered thresholds as the erase counts increase.

CONCLUSION

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the actual steps taken in the processes shown in FIGS. 3, 4, and 6 may differ from those shown in the figures. Depending on the embodiment, certain of the steps described in the example above may be removed, others may be added, and the sequence of steps may be altered and/or performed in parallel. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method of performing wear leveling operations in a non-volatile data storage subsystem that comprises blocks of memory, the method comprising:
    receiving a command that specifies an erase operation on a superblock of a plurality of superblocks in the storage subsystem, said superblock comprising a plurality of blocks, each block residing in one of a plurality of dies in the storage subsystem, wherein each of the dies is associated with an individual wear leveling threshold that is based on (1) a position of the die within the plurality of dies and (2) an interval threshold denoting a minimum frequency at which a wear leveling operation is to be performed on a block;
    incrementing an erase counter associated with each block in said superblock to reflect said erase operation on the superblock; and
    using said erase counters to control a timing with which wear leveling operations are performed on specific blocks in the superblock, the timing being determined by comparing at least one of said erase counters to at least one of the individual wear leveling thresholds associated with the dies to determine whether an individual wear leveling threshold has been reached.

2. The method of claim 1, further comprising performing a wear leveling operation on a block of the superblock that is in the die in which its associated individual wear leveling threshold has been reached.

3. The method of claim 1, wherein the individual wear leveling threshold associated with each of the dies is different.

4. The method of claim 1, wherein the individual wear leveling threshold associated with each of the dies is assigned in accordance with a rotation.

5. The method of claim 1, wherein the individual wear leveling threshold associated with each of the dies is a sum of a position number of the associated die and the interval threshold.

6. A data storage subsystem capable of regulating a maximum number of wear leveling operations triggered by an erase operation, the data storage subsystem comprising:
    a non-volatile solid-state memory array comprising a plurality of groups of blocks, the blocks within each group of blocks distributed across different ones of a plurality of memory units in the non-volatile solid-state memory array; and
    a controller configured to:
        receive an erase command directed to a group of the plurality of groups of blocks; and
        determine whether to perform a wear leveling operation on at least one block in the group of blocks to which the erase command is directed, the determining based at least on (1) a number of erase commands already performed on individual blocks within the group, and (2) one or more individual wear leveling thresholds associated with memory units to which the blocks in the group are distributed,
    wherein an individual wear leveling threshold associated with at least some memory units differs from an individual wear leveling threshold associated with at least some other memory units, and
    wherein each of the individual wear leveling thresholds is based on (1) a position of the memory unit within the plurality of memory units and (2) an interval threshold denoting a minimum frequency at which a wear leveling operation is to be performed on a block.

7. The data storage subsystem of claim 6, wherein each memory unit is a die.

8. The data storage subsystem of claim 7, wherein the controller is configured to perform the wear leveling operation by at least:
    assigning a first block in the group determined as needing wear leveling to a different group of blocks;
    assigning, to the group in place of the first block, a second block with a smaller number of erase commands already performed than the first block; and
    moving data in the second block to the first block.

9. The data storage subsystem of claim 6, wherein each memory unit is a plane.

10. A data storage subsystem capable of regulating a maximum number of wear leveling operations triggered by an erase operation, the data storage subsystem comprising:
    a non-volatile solid-state memory array comprising a plurality of groups of blocks, the blocks within each group of blocks distributed across different ones of a plurality of memory units in the non-volatile solid-state memory array; and
    a controller configured to:
        receive an erase command directed to a group of the plurality of groups of blocks; and
        determine whether to perform a wear leveling operation on at least one block in the group of blocks to which the erase command is directed, the determining based at least on (1) a number of erase commands already performed on individual blocks within the group, and (2) one or more individual wear leveling thresholds associated with memory units to which the blocks in the group are distributed,
    wherein an individual wear leveling threshold associated with at least some memory units differs from an individual wear leveling threshold associated with at least some other memory units, and
    wherein the individual wear leveling threshold associated with a memory unit is a sum of (1) a position number of the associated memory unit within the plurality of memory units and (2) an interval threshold denoting a minimum frequency at which a wear leveling operation is to be performed on a block.

11. The data storage subsystem of claim 10, wherein the position number is assigned according to a rotation.

12. The data storage subsystem of claim 11, wherein the rotation comprises traversing the plurality of memory units.

13. A data storage subsystem capable of regulating a maximum number of wear leveling operations triggered by an erase operation, the data storage subsystem comprising:
    a non-volatile solid-state memory array comprising a plurality of groups of blocks, the blocks within each group of blocks distributed across different ones of a plurality of memory units in the non-volatile solid-state memory array; and
    a controller configured to:
        receive an erase command directed to a group of the plurality of groups of blocks;
        determine whether to perform a wear leveling operation on at least one block in the group of blocks to which the erase command is directed, the determining based at least on (1) a number of erase commands already performed on individual blocks within the group, and (2) one or more individual wear leveling thresholds associated with memory units to which the blocks in the group are distributed;

for each of the blocks in group, perform a modulo operation with (1) a difference between the number of erase commands already on the block and the individual wear leveling threshold associated with the memory unit to which the block is assigned and (2) an interval threshold denoting a minimum frequency at which a wear leveling operation is to be performed on a block; and select the block for a wear leveling operation when the modulo operation results in a zero remainder, wherein an individual wear leveling threshold associated with at least some memory units differs from an individual wear leveling threshold associated with at least some other memory units.

14. A method for regulating a maximum number of wear leveling operations triggered by an erase operation in a non-volatile data storage subsystem comprising a plurality of groups of blocks, the blocks within each group of blocks distributed across different ones of a plurality of memory units in the non-volatile data storage subsystem, the method comprising:

receiving an erase command directed to a group of the plurality of groups of blocks; and determining whether to perform a wear leveling operation on at least one block in the group of blocks to which the erase command is directed, the determining based at least on (1) a number of erase commands already performed on individual blocks within the group, and (2) one or more individual wear leveling thresholds associated with memory units to which the blocks in the group are distributed, wherein an individual wear leveling threshold associated with at least some memory units differs from an individual wear leveling threshold associated with at least some other memory units, and wherein each of the individual wear leveling thresholds is based on (1) a position of the memory unit within the plurality of memory units and (2) an interval threshold denoting a minimum frequency at which a wear leveling operation is to be performed on a block.

15. The method of claim 14, wherein each memory unit is a die.

16. The method of claim 14, wherein the wear leveling operation comprises:

assigning a first block in the group determined as needing wear leveling to a different group of blocks;

assigning, to the group in place of the first block, a second block with a smaller number of erase commands already performed than the first block; and moving data in the second block to the first block.

17. The method of claim 14, wherein each memory unit is a plane.

18. A method for regulating a maximum number of wear leveling operations triggered by an erase operation in a non-volatile data storage subsystem comprising a plurality of groups of blocks, the blocks within each group of blocks distributed across different ones of a plurality of memory units in the non-volatile data storage subsystem, the method comprising:

receiving an erase command directed to a group of the plurality of groups of blocks; and determining whether to perform a wear leveling operation on at least one block in the group of blocks to which the erase command is directed, the determining based at least on (1) a number of erase commands already performed on individual blocks within the group, and (2) one or more individual wear leveling thresholds associated with memory units to which the blocks in the group are distributed, wherein an individual wear leveling threshold associated with at least some memory units differs from an individual wear leveling threshold associated with at least some other memory units, and wherein the individual wear leveling threshold associated with a memory unit is a sum of (1) a position number of the associated memory unit within the plurality of memory units and (2) an interval threshold denoting a minimum frequency at which a wear leveling operation is to be performed on a block.

19. The method of claim 18, wherein the position number is assigned according to a rotation.

20. The method of claim 19, wherein the rotation comprises traversing the plurality of memory units.

21. A method for regulating a maximum number of wear leveling operations triggered by an erase operation in a non-volatile data storage subsystem comprising a plurality of groups of blocks, the blocks within each group of blocks distributed across different ones of a plurality of memory units in the non-volatile data storage subsystem, the method comprising:

receiving an erase command directed to a group of the plurality of groups of blocks;

determining whether to perform a wear leveling operation on at least one block in the group of blocks to which the erase command is directed, the determining based at least on (1) a number of erase commands already performed on individual blocks within the group, and (2) one or more individual wear leveling thresholds associated with memory units to which the blocks in the group are distributed;

for each of the blocks in group, performing a modulo operation with (1) a difference between the number of erase commands already on the block and the individual wear leveling threshold associated with the memory unit to which the block is assigned and (2) an interval threshold denoting a minimum frequency at which a wear leveling operation is to be performed on a block; and selecting the block for a wear leveling operation when the modulo operation results in a zero remainder, wherein an individual wear leveling threshold associated with at least some memory units differs from an individual wear leveling threshold associated with at least some other memory units.

* * * * *